(12) United States Patent
Honda et al.

(10) Patent No.: US 7,579,109 B2
(45) Date of Patent: Aug. 25, 2009

(54) ENERGY DEVICE AND ELECTRONIC EQUIPMENT USING THE SAME, AND METHOD FOR PRODUCING ENERGY DEVICE

(75) Inventors: Kazuyoshi Honda, Takatsuki (JP); Sadayuki Okazaki, Katano (JP); Kiichiro Oishi, Kyoto (JP); Yoriko Takai, Toyonaka (JP)

(73) Assignee: Panasonic Corporation, Osaka (JP)

( * ) Notice: Subject to any disclaimer, the term of this patent is extended or adjusted under 35 U.S.C. 154(b) by 949 days.

(21) Appl. No.: 11/028,826

(22) Filed: Jan. 3, 2005

(65) Prior Publication Data
US 2005/0158619 A1    Jul. 21, 2005

(30) Foreign Application Priority Data
Jan. 19, 2004    (JP)    ............... 2004-010857

(51) Int. Cl.
H01M 2/26    (2006.01)
H01M 2/28    (2006.01)
(52) U.S. Cl. .............. 429/161; 429/162; 429/231.95; 29/623.1
(58) Field of Classification Search ............... 429/161, 429/162, 231, 95
See application file for complete search history.

(56) References Cited

U.S. PATENT DOCUMENTS

| | | | |
|---|---|---|---|
| 5,019,468 A | 5/1991 | Miyabayashi | |
| 5,073,684 A | 12/1991 | Miyabayashi | |
| 5,147,482 A | 9/1992 | Miyabayashi | |
| 5,939,217 A | 8/1999 | Tamura et al. | |
| 2001/0033963 A1* | 10/2001 | Yamazaki et al. | ........... 429/162 |

FOREIGN PATENT DOCUMENTS

| | | | |
|---|---|---|---|
| JP | 8-17179 | | 1/1996 |
| JP | 8-17179 A | * | 1/1996 |
| JP | 9-259860 | | 10/1997 |
| JP | 10-188947 | | 7/1998 |
| JP | 11-345604 | | 12/1999 |
| JP | 2000-307134 | | 11/2000 |
| JP | 2000-340265 | | 12/2000 |
| JP | 2001-185123 | | 7/2001 |
| JP | 2001-273914 | | 10/2001 |
| JP | 2002-366059 | | 12/2002 |

* cited by examiner

Primary Examiner—Patrick Ryan
Assistant Examiner—Ben Lewis
(74) Attorney, Agent, or Firm—Hamre, Schumann, Mueller & Larson, P.C.

(57) ABSTRACT

A sheet-shaped energy device includes at least sheet-shaped battery cells, in each of which a positive collector, a negative collector, a positive active material, and an electrolyte are laminated, and a plurality of substrates in a thickness direction. An internal wiring pattern and/or an optical function part are formed on at least one substrate excluding a substrate constituting an outermost layer of the energy device among the plurality of substrates. Because of this, a constraint on the arrangement of various kinds of components used simultaneously with the sheet-shaped energy device and lengthy wiring can be reduced in electronic equipment.

16 Claims, 4 Drawing Sheets

ENERGY DEVICE AND ELECTRONIC EQUIPMENT USING THE SAME, AND METHOD FOR PRODUCING ENERGY DEVICE

BACKGROUND OF THE INVENTION

1. Field of the Invention

The present invention relates to an energy device and a method for producing the same. The present invention also relates to electronic equipment using an energy device.

2. Description of the Related Art

The miniaturization and enhancement in performance of electronic equipment are proceeding continuously. In order to achieve the miniaturization and enhance the performance of equipment, it is necessary that various kinds of devices such as a semiconductor integrated circuit, a module, a chip component, a multi-layered substrate, a flat cable, and the like constituting the equipment are miniaturized and have enhanced performance. An energy device such as a battery also is being miniaturized and enhanced in performance along with the miniaturization of electronic equipment.

A lithium ion secondary battery that is representative of miniaturized high-performance energy devices is composed mainly of a negative collector, a negative active material, an electrolyte, a separator, a positive active material, and a positive collector. The miniaturization and enhancement in performance of the lithium ion secondary battery can be realized by providing, in parallel, the increase in energy density of active materials for positive and negative electrodes, the reduction in thickness of collectors of positive and negative electrodes, the enhancement in performance of an electrolyte, the reduction in thickness of a separator, etc.; the increase in energy density of a battery; and the assurance of safety that is becoming difficult to achieve in close connection with the above-mentioned proceeding. This enables, for example, high-performance mobile equipment to be miniaturized and driven for a long period of time.

The reduction in thickness is one of the important items among the miniaturization and reduction in weight required of mobile equipment, and for this purpose, the reduction in thickness of an energy device is proceeding. A liquid-type lithium ion secondary battery using an electrolyte solution requires measures for preventing leakage of liquid, so that the reduction in thickness involves difficulty. Thus, a thin battery using a solid electrolyte is a promising candidate. Representative examples of such a thin battery include not only a polymer battery but also a thin-film lithium ion secondary battery. The thin-film lithium ion secondary battery generally has a battery constituent layer (battery cell) including a positive collector layer, a positive active material layer, a solid electrolyte layer, a negative active material layer, and a negative collector layer in this order. The respective layers of the battery constituent layer generally are formed successively by a vacuum thin-film process such as vapor deposition.

A sheet-shaped energy device is very effective for reducing the thickness of equipment, so that it is becoming a device important in future electronic equipment.

For example, JP2002-366059A discloses a very thin portable information terminal with high visibility even at a dimly lit place, including at least an organic EL display, a plurality of IC chips, an antenna coil for communication, a key switch for input, a sheet-shaped energy device, and the like. According to JP2002-366059A, a transparent substrate of the organic EL display is mainly composed of a polymer, the IC chips are formed to be thin, and the like, whereby a portable information terminal that is not easily broken by bending can be obtained. Furthermore, JP2002-366059A describes that highly water-resistant materials are used as constituent materials for the transparent substrate and a support substrate or a multi-layered wiring substrate to be a core of the portable information terminal, and the organic EL display is sealed with these materials, whereby the display can be prevented from being degraded due to the moisture absorption and be highly reliable.

By using a sheet-shaped energy device as described above, the reduction in thickness and weight of mobile equipment and the like can be achieved. However, the energy device occupies a large area in electronic equipment due to its sheet shape, so that there is a great constraint on the arrangement of other devices and a wiring substrate. Particularly, in the case of assuming high-frequency equipment, there is a possibility that lengthy wiring may degrade the reliability of the equipment. Measures for eliminating such a demerit while maintaining the characteristic thinness of the sheet-shaped energy device are required.

SUMMARY OF THE INVENTION

Therefore, with the foregoing in mind, it is an object of the present invention to provide an energy device capable of reducing the constraint on the arrangement of various kinds of components used simultaneously and lengthy wiring, and a method for producing the energy device. It is another object of the present invention to provide electronic equipment that is reduced in thickness and has enhanced performance by using such an energy device.

In order to achieve the above-mentioned object, a first energy device of the present invention includes at least a sheet-shaped battery cell, in which a positive collector, a negative collector, an electrode active material, and an electrolyte are laminated, and a plurality of substrates in a thickness direction. An internal wiring pattern is formed on at least one substrate excluding a substrate constituting an outermost layer of the energy device among the plurality of substrates.

Furthermore, a second energy device of the present invention includes at least a sheet-shaped battery cell, in which a positive collector, a negative collector, an electrode active material, and an electrolyte are laminated, and a plurality of substrates in a thickness direction. An optical function part is formed on at least one substrate excluding a substrate constituting an outermost layer of the energy device among the plurality of substrates.

First electronic equipment of the present invention includes the first or second energy device of the present invention, and at least one selected from the group consisting of an electronic component, a mechanical component, a semiconductor chip, an optical component, a conductive cable, and an optical fiber placed in an opening extending through the energy device in the thickness direction.

Second electronic equipment of the present invention includes the first energy device of the present invention, and electronic components placed on both sides of the energy device, electrically connected to each other via a through electrode provided in the energy device.

Third electronic equipment of the present invention includes the first energy device of the present invention, an external wiring pattern formed on one surface or both surfaces of the energy device, and an electronic component placed on one side or both sides of the energy device. The electronic component is electrically connected to a through electrode provided in the energy device and/or the external wiring pattern provided thereon.

Fourth electronic equipment of the present invention includes the second energy device of the present invention, and optical components placed on both sides of the energy device, optically connected to each other via a through optical device provided in the energy device.

Furthermore, a first method for producing an energy device of the present invention includes: forming a wiring pattern and/or an optical function part, and at least an electrode active material and an electrolyte on an insulating substrate to obtain a sheet-shaped material; and winding, bending, or stacking the sheet-shaped material to obtain a laminated sheet-shaped material.

A second method for producing an energy device of the present invention includes: forming a wiring pattern and/or an optical function part on one surface of a substrate and forming a sheet-shaped battery cell on the other surface of the substrate to obtain a lamination unit; and laminating at least two of the lamination units via a first insulating layer.

These and other advantages of the present invention will become apparent to those skilled in the art upon reading and understanding the following detailed description with reference to the accompanying figures.

DESCRIPTION OF THE PREFERRED EMBODIMENTS

The energy device and electronic equipment of the present invention contains an internal wiring pattern and an optical function part, so that the degree of freedom in arrangement of various kinds of components constituting the electronic equipment is enhanced in spite of the thinness. Furthermore, an electronic component and an optical component can be connected efficiently without installing lengthy wiring. Shortening the length of wiring is effective for the reduction in cost for members to be used, the reduction in volume and weight due to the decrease in wiring itself, the reduction in factors of equipment trouble, and the like. Furthermore, when the electronic equipment is high-frequency equipment, a malfunction due to the adverse effect of a floating inductance can be prevented by the shortened length of electric wiring, so that the reliability of a high-frequency operation is enhanced. Thus, small, thin, light-weight, and high-performance electronic equipment can be realized.

Furthermore, according to a method for producing an energy device of the present invention, the above-mentioned energy device of the present invention can be produced efficiently and easily.

The applicable field of the energy device and the electronic equipment of the present invention is not particularly limited, and the energy device and the electronic equipment can be used for thin, light-weight, and small mobile equipment, and the like. Particularly, in the case where the energy device is a lithium ion secondary battery using a solid electrolyte, the effect of the present invention is exhibited remarkably.

Hereinafter, the present invention will be described by way of embodiments with reference to the drawings.

EMBODIMENT 1

Figure 1:
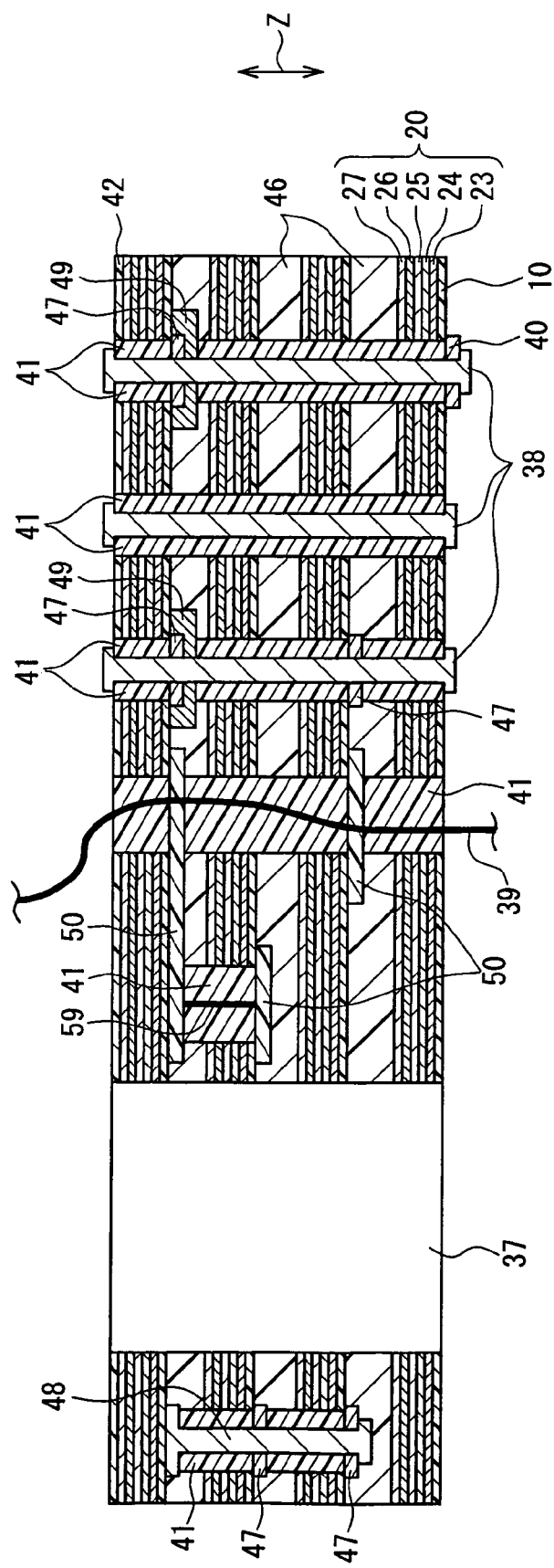
FIG. 1 is a cross-sectional view schematically showing one embodiment of an energy device of the present invention.

The energy device (sheet-shaped battery) of the present invention will be described. FIG. 1 is a cross-sectional view schematically showing an exemplary configuration of the energy device of the present invention. The energy device of the present embodiment includes a substrate 10, and a sheet-shaped battery cell 20 formed on the substrate 10. The battery cell 20 includes a negative collector layer 23, a negative active material layer 24, a solid electrolyte layer 25, a positive active material layer 26, and a positive collector layer 27 in this order. According to the present invention, a lamination direction (represented by an arrow Z in FIG. 1) in which respective layers of the battery cell 20 and the substrate 10 are laminated refers to a "thickness direction".

As the substrate 10, for example, a flexible material such as polyimide (PI), polyamide (PA), polyethylene naphthalate (PEN), polyethylene terephthalate (PET) or other polymer films; a stainless steel foil; or a metal foil containing nickel, copper, aluminum or other metal elements, can be used. Furthermore, silicon, glass, ceramic, plastic, or the like in various kinds of shapes also can be used, and there is no particular limit to the material and shape of the substrate in the present invention.

As the negative collector layer 23, for example, metal such as nickel, copper, aluminum, platinum, platinum-palladium, gold, silver, or ITO (indium-tin oxide) can be used. Depending upon the final form of the energy device, in the case where the substrate 10 is placed on the negative electrode side and a conductive material is used as the substrate 10, the substrate 10 also is allowed to function as the negative collector layer 23 with the negative collector layer 23 omitted.

As the negative active material layer 24, for example, metallic lithium, amorphous silicon, graphite, or the like can be used. It should be noted that the material for the negative active material layer 24 of the present invention is not limited to the above, and other materials also can be used. Metal ions released from the positive active material layer 26 also may be deposited on the negative collector layer 23 to form the negative active material layer 24. In this case, in the initial stage of forming the energy device, the negative active material layer 24 can be omitted.

As the solid electrolyte layer 25, a material having ion conductivity and negligible small electron conductivity can be used. Particularly, in the case where the energy device is a lithium ion secondary battery, since lithium ions are mobile ions, a solid electrolyte composed of $Li_3PO_4$, a material (LiPON: a typical composition thereof is $Li_{2.9}PO_{3.3}N_{0.36}$) obtained by mixing $Li_3PO_4$ with nitrogen (or by replacing a part of elements of $Li_3PO_4$ with nitrogen), or the like is preferable due to its excellent lithium ion conductivity. Similarly, a solid electrolyte made of a sulfide such as $Li_2S$—$SiS_2$, $Li_2S$—$P_2S_5$, $Li_2S$—$B_2S_3$, or the like also is effective. Furthermore, solid electrolytes obtained by doping the above-mentioned solid electrolytes with lithium halide such as LiI, or a lithium oxyacid salt of $Li_3PO_4$, etc. also is effective. The material for the solid electrolyte layer 25 of the present invention is not limited to the above, and other materials may be used as the solid electrolyte layer 25. By using a solid electrolyte as the electrolyte, measures for preventing leakage of liquid, which are indispensable in a conventional liquid electrolyte, are not required, which makes it easy to miniaturize an energy device and reduce the thickness thereof.

As the positive active material layer 26, for example, lithium cobaltate, lithium nickelate, or the like can be used. It should be noted that the material for the positive active material layer 26 of the present invention is not limited to the above, and other materials also can be used.

As the positive collector layer 27, for example, metal such as nickel, copper, aluminum, platinum, platinum-palladium, gold, silver, titanium, or ITO (indium-tin oxide) can be used in the same way as in the negative collector layer 23. Depending upon the final form of the energy device, in the case where the substrate 10 is placed on the positive electrode side and a conductive material is used as the substrate 10, the substrate 10 also is allowed to function as the positive collector layer 27 with the positive collector layer 27 omitted.

The respective layers constituting the battery cell 20 are laminated successively on the substrate 10 by a method described later. Although the lamination order on the substrate 10 may start from the negative collector layer 23 side as shown in FIG. 1, it may start from the positive collector layer 27 side. Furthermore, the following may be possible: the battery cell 20 is laminated on the substrate 10, and then, the substrate 10 is removed by peeling; thereafter, an energy device is formed.

Furthermore, if required, for example, the improvement of charging/discharging characteristics by forming the electrode active material layers 24, 26 in a multi-layered structure, the enhancement in adhesion strength by providing an interface layer between the respective layers, and the enhancement in safety by including a PTC protective element layer also can be applied to the energy device of the present invention in the same way as proposed previously in energy devices.

The energy device of the present invention includes a plurality of layers of the substrates 10. An internal wiring pattern (hereinafter, simply referred to as a "wiring pattern") 47 and/or an optical function part 50 are formed on at least one substrate 10 excluding the substrate 10 constituting an outermost layer of the energy device among a plurality of layers of the substrates 10 (i.e., the substrate 10 present as an internal layer of the energy device).

In the case where the wiring pattern 47 is formed on the substrate 10 made of a conductive material such as a metal foil, in order to keep the function of the wiring pattern 47, it is preferable that an insulating underlying layer (not shown) is interposed between the substrate 10 and the wiring pattern 47. The insulating underlying layer can be formed by coating, attachment, a thin-film process, or other various kinds of methods. As the material for the insulating underlying layer, an organic material such as resin, an inorganic material such as an oxide or a nitride, or other various kinds of insulating materials can be used.

As the material for the wiring pattern 47, copper, aluminum, gold, silver, platinum, or the like can be used. The material for the wiring pattern 47 is not limited to the above materials, and other metal materials or various kinds of conductive materials such as a conductive paste can be used.

The relationship between the wiring pattern 47 and the battery cell 20 on the substrate 10 is, for example, as follows. For example, the wiring pattern 47 may be formed on one surface of the substrate 10 directly or via an insulating underlying layer (not shown), and the battery cell 20 may be formed on the other surface of the substrate 10. Alternatively, the wiring pattern 47 may be formed on one surface of the substrate 10 directly or via an insulating underlying layer (not shown), and the battery cell 20 may be formed on the wiring pattern 47 via an insulating intermediate layer (not shown). As the method and material for forming the insulating intermediate layer, various kinds of formation methods and materials similar to those for forming the insulating underlying layer can be applied.

The optical function part 50 can be placed on the substrate 10 in place of the wiring pattern 47 or together therewith. An example of the optical function part 50 includes a plate-shape optical fiber-like structure or a waveguide.

For example, an optical material such as $SiO_2$, optical resin, or the like can be formed on the substrate 10 in the same way as in the wiring pattern 47. By stacking the substrate 10 thus obtained together with the battery cell 20 in plural layers, a sheet-shaped energy device can be obtained.

In the energy device of the present invention, a plurality of such sheet-shaped battery cells 20 may be laminated in the thickness direction. This can increase a battery capacity while keeping the degree of freedom in a circuit design. Examples of the method for laminating battery cells include: a winding method for winding up a sheet-shaped material composed of the battery cell 20 and the substrate 10, formed in a long band shape, to form a plate-shaped material; a fanfolding method for fanfolding a sheet shaped material composed of the battery cell 20 and the substrate 10, formed in a long band shape, in a zigzag manner; a stacking method for stacking a required number of sheet-shaped materials each having a predetermined size and being composed of the battery cell 20 and the substrate 10; and the like. Furthermore, two or more of these methods may be combined. Consequently, an energy device having a plurality of the sheet-shaped battery cells 20 and a plurality of layers of the substrates 10 in the thickness direction can be obtained. By forming the wiring pattern 47 and/or the optical function part 50 at a predetermined position on the substrate 10 prior to lamination, an energy device can be produced in which the wiring pattern 47 and/or the optical function part 50 are formed on at least one substrate 10 excluding the substrate constituting an outermost layer. In the energy device formed by the winding method or the fanfold method, the battery cell 20 and the substrate 10 are respectively formed of a single continuous sheet; however, the energy device has a multi-layered structure in which a plurality of the battery cells 20 and a plurality of layers of the substrates 10 are present in the thickness direction. According to the present invention, this case also is referred to as having "a plurality of" the battery cells 20 and the substrates 10 in the thickness direction. Furthermore, it is preferable that an insulating material is used for the substrate 10, since it becomes easy to keep the function of the wiring pattern 47 and the insulation between the wiring pattern 47 and the battery cell 20.

The wiring pattern 47 and/or the optical function part 50 may be formed on all the substrates 10 to be stacked in the thickness direction. They may be formed on only a part of the substrates 10 depending upon the required wiring conditions.

In the energy device of the present invention, a protective film (not shown) can be provided for each sheet-shaped battery cell 20 or so as to cover an entirety of a plurality of the sheet-shaped laminated battery cells 20. By providing the protective film, for example, moisture resistance characteristics of the energy device can be enhanced.

The energy device of the present invention may include one of the opening 37, the through electrode 38, and the through optical device 39 at a desired position in a region of the battery cell 20.

The opening 37 extends through the energy device in the thickness direction. Although there is no particular limit to the shape and size of the opening 37, it is preferable that the opening 37 is set to have a shape and a size required for placing various kinds of components using the opening 37.

By appropriately setting the shape and size of the opening 37, the reduction in capacity of the energy device can be suppressed. Furthermore, it is preferable that the position of the opening 37 is set appropriately in accordance with the kinds of components to be placed in the opening 37 and the form of electronic equipment configured using the energy device.

The through electrode 38 extends, as designated by the name thereof, through the energy device in the thickness direction to provide electrodes on both surfaces of the energy device, and brings the front and back surfaces of the energy device into electrical conduction. In order to prevent a positive electrode and a negative electrode of the battery cell 20 from being short-circuited via the through electrode 38, it is necessary that the through electrode 38 is not connected directly to any of the positive collector layer 27, the negative collector layer 23, and the electrode active material layers 24 and 26. As the material for the through electrode 38, gold, copper, nickel, aluminum, indium, zinc, an alloy containing these elements, or the like can be used in terms of reliability, processability, and low resistance. However, other metal materials also can be used. A plating or solder may be used. Furthermore, various kinds of conductive paste materials also can be used instead of a metal material.

The through electrode 38 may be connected to the wiring pattern 47. Because of this, using the end face of the through electrode 38 exposed at the surface of the energy device, a signal can be input/output with respect to the wiring pattern 47 provided inside the energy device. Furthermore, by connecting a plurality of the wiring patterns 47 provided inside the energy device via the through electrode 38, a signal can be shared among a plurality of the wiring patterns 47.

There is no particular limit to the components that can be electrically connected using the through electrode 38. Examples of the components include, but are not limited to various kinds of surface-mounting electronic components in a chip shape or a sheet shape; a protective component such as a fuse, a PTC element, or the like; an electromechanical component such as a semiconductor chip, an interposer for a semiconductor, a switch, or the like; a component for input such as a touch panel, a keyboard, or the like; an optical component such as a backlight, a CCD, or the like, etc.

The through optical device 39 extends through the energy device in the thickness direction, and enables the transmission/reception of optical information between both surfaces of the energy device. There is no particular limit to the optical information to be transmitted/received, and examples of the optical information to be transmitted/received include illumination light and reflection light in a visible region or an invisible region, optical communication information, and the like. Furthermore, optical information can be transmitted/received in various forms such as an optical filter operation, a laser optical guide, and the like, in addition to mere transmission/reception.

The through optical device 39 may be connected to the optical function part 50. Because of this, the function of the optical function part 50 placed inside the energy device can be extracted to the surface of the energy device via the through optical device 39, and the functions are transmitted/received between a plurality of the optical function parts 50 via the through optical device 39. Thus, the through optical device 39 needs to be selected depending upon the purpose thereof. Examples of the material for the through optical device 39 include, but are not limited to a glass or plastic fiber, a multi-layered optical thin film, metallic germanium, a deflector, an analyzer, liquid crystal, and the like.

The through electrode 38 and the through optical device 39 need not be exposed at both surfaces of the sheet-shaped energy device, and can be designed in accordance with a required specification. For example, the through electrode 38 and the through optical device 39 may be exposed at only one surface of the sheet-shaped energy device. The present invention includes not only the case where the through electrode 38 and the through optical device 39 extend through the sheet-shaped energy device to be exposed at both surfaces of the device, but also the case where the through electrode 38 and the through optical device 39 extend through the sheet-shaped energy device to be exposed at only one surface of the device.

Furthermore, an internal connection electrode 48 may be provided, which is connected to a plurality of the wiring patterns 47 formed respectively on a plurality of the substrates 10, is not connected directly to any of the positive collector 27, the negative collector 23, and the electrode active material 25, and is not exposed at the surfaces of the energy device (i.e., buried in the energy device). As the material for the internal connection electrode 48, gold, copper, nickel, aluminum, indium, zinc, an alloy containing these elements, or the like can be used in terms of reliability, processability, and low resistance. However, other metal materials also can be used. A plating and solder may be used. Furthermore, various kinds of conductive paste materials also can be used instead of a metal material. Due to the internal connection electrode 48, a plurality of the wiring patterns 47 formed at different positions in the thickness direction can be connected to each other efficiently, without occupying an area on the front and back surfaces of the energy device.

Furthermore, an internal connection optical device 59 may be provided, which is optically connected to a plurality of the optical function parts 50 formed respectively on a plurality of the substrates 10 and is not directly exposed at the surfaces of the energy device (i.e., buried in the energy device). Due to the internal connection optical device 59, a plurality of the optical function parts 50 formed at different positions in the thickness direction can be connected to each other efficiently, without occupying an area on the front and back surfaces of the energy device. A similar material to that for the through optical device 39 can be used for the internal connection optical device 59.

Figure 2:
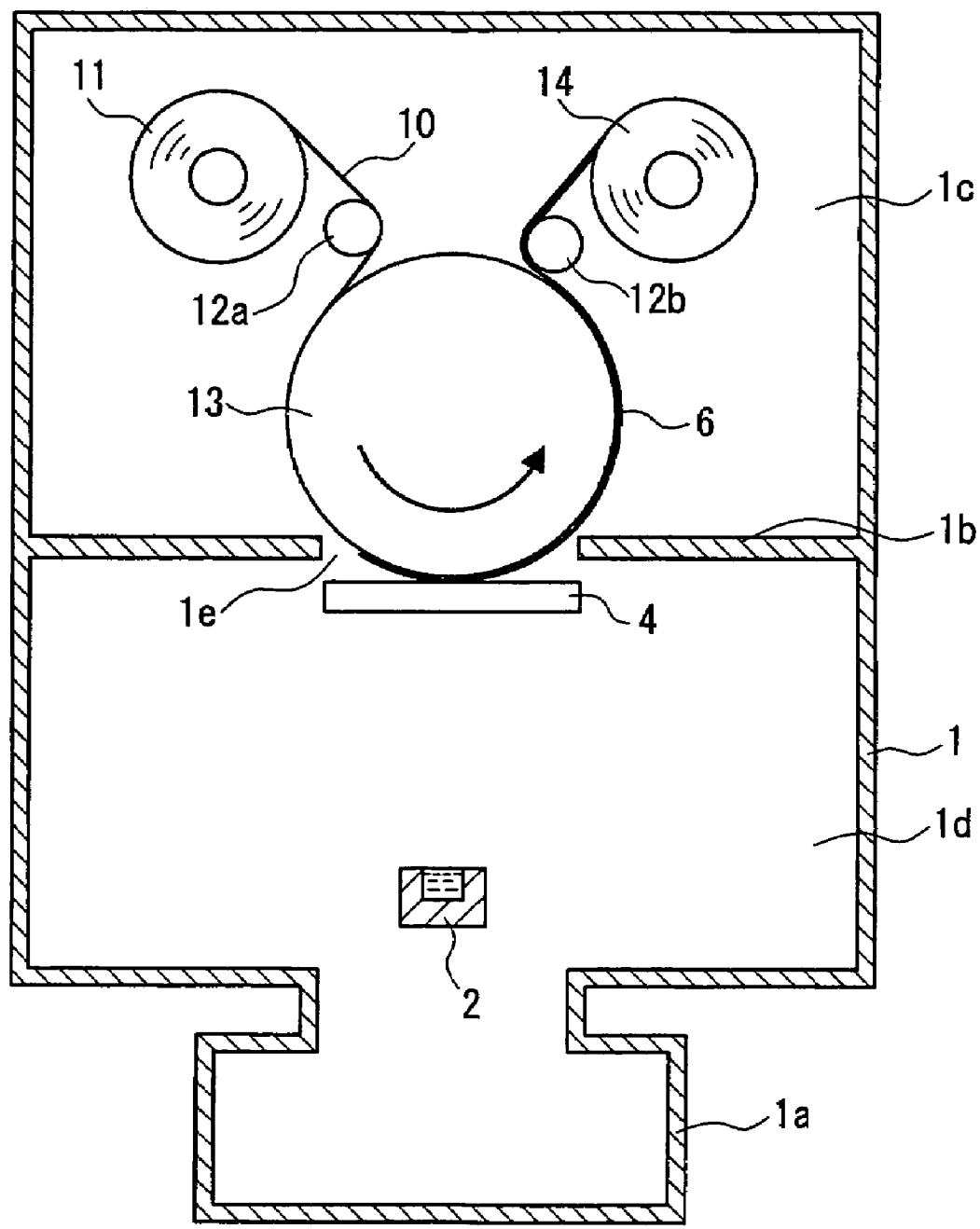
FIG. 2 is a schematic cross-sectional view showing one embodiment of an apparatus used for producing the energy device of the present invention.

Next, an exemplary method for producing an energy device of the present invention will be described. FIG. 2 schematically shows a configuration of a production apparatus used in one process of the method for producing an energy device of the present invention.

A vacuum tank 1 is partitioned into upper and lower chambers by a partition wall 1b. In the chamber (transportation chamber) 1c on an upper side of the partition wall 1b, an unwinding roll 11, a transportation roller 12a, a cylindrical can roll 13, a transportation roller 12b, and a take-up roll 14 are placed. In the chamber (thin film forming chamber) 1d on a lower side of the partition wall 1b, a film-forming source 2 and a pattern mask 4 are provided. An exhaust pump 1a for keeping a predetermined degree of vacuum in the vacuum tank 1 is connected to the thin film forming chamber 1d. An opening 1e is provided at the center of the partition wall 1b, and the pattern mask 4 is provided so as to close the opening 1e. A lower surface of the can roll 13 is exposed at the thin film forming chamber 1d side via the opening 1e and an opening formed in the pattern mask 4.

The long flexible substrate 10 unwound from the unwinding roll 11 is transported successively by the transportation roller 12a, the can roll 13, and the transportation roller 12b, and taken up around the take-up roll 14. Herein, while the substrate 10 travels along an outer circumferential surface of the can roll 13, film-forming particles (atoms, molecules, a cluster, etc.) released from the film-forming source 2 pass through the opening of the pattern mask 4 to adhere to the substrate 10, thereby forming a thin film 6. The substrate 10 with the thin film 6 formed thereon is taken up around the take-up roll 14.

As a method for forming the thin film 6, various kinds of thin film processes such as vapor deposition, sputtering, ion plating, laser abrasion, and the like can be used.

By setting a plurality of film-forming sources 2 in the vacuum tank 1, a plurality of layers constituting the battery cell 20 may be formed during one traveling process from a time when the substrate 10 is unwound from the unwinding roll 11 to a time when the substrate 10 is taken up around the take-up roll 14.

By repeating the traveling of the substrate 10 and the film formation to be performed midway through the traveling a required number of times, the battery cell 20 can be formed on the substrate 10, in which the positive collector layer 27, the positive active material layer 26, the solid electrolyte layer 25, the negative active material layer 24, and the negative collector layer 23 are laminated in this order, or they are laminated in an opposite order thereto. The substrate 10 with the battery cell 20 formed thereon is taken up around the take-up roll 14 as a sheet-shaped material. The sheet-shaped material thus taken up is spread out, whereby a sheet-shaped battery can be obtained.

As a method for forming the wiring pattern 47 on the substrate 10, various methods known in the production of a wiring substrate, such as printing, plating, a thin film process, and the like, can be used. Particularly, in the case where the wiring pattern 47 has a minute pattern, a method such as laser etching, inkjet coating, or the like also is effective. It is preferable that the wiring pattern 47 is formed on the substrate 10 before the battery cell 20 is formed thereon. However, the wiring pattern 47 may be formed on the substrate 10 after the battery cell 20 is formed thereon.

The through electrode 38 and the internal connection electrode 48 can be formed, for example, by forming through-holes extending through the energy device in the thickness direction, and filling the through-holes with a conductive material. For example, the through electrode 38 and the internal connection electrode 48 can be formed by inserting a thin bar made of gold or the like in each through-hole, and then, deforming end portions of the thin bar so as to crush them to form a rivet shape, or by injecting conductive resin into the through-holes.

In order to electrically connect the through electrode 38 to the wiring pattern 47 exactly, for example, the following method is effective. The diameter of the through-hole to be formed in an insulating layer (first insulating layer) 46 interposed between the substrate 10 and the battery cell 20 for the purpose of keeping insulation is set to be smaller than that of the through-holes to be formed in the other layers. Then, an auxiliary pattern 49 made of a metal thin film or the like is formed so as to be electrically connected to the wiring pattern 47 on a circumference of the through-hole formed in the insulating layer 46. Since the inner diameter of the through-hole formed in the auxiliary pattern 49 is relatively small, an electrical connection between the through electrode 38 and the auxiliary pattern 49 is kept. Then, the auxiliary pattern 49 and the wiring pattern 47 come into contact with each other to be electrically connected to each other. Consequently, the through electrode 38 and the wiring pattern 47 are electrically connected to each other. It should be noted that the electrical connection method between the through electrode 38 and the wiring pattern 47 of the present invention is not limited to the above. The electrical connection between the internal connection electrode 48 and the wiring pattern 47 also can be performed in the same way as the above.

An example of the optical function part 50 includes a plate-shaped optical fiber-like structure or a waveguide. The optical function part 50 can be formed on the substrate 10, for example, by providing the substrate 10 with an optical material such as $SiO_2$, optical resin, or the like by a thin film process, a coating process, attachment or other methods, or a combination thereof. For example, in the case of forming an optical fiber-like structure, it is important that a core part and a clad part are formed so as to prevent the loss of light, and some idea such as the arrangement of materials with different refractive indexes in a multi-layered structure may be used appropriately. The method for forming the optical function part 50 is not limited to the above, depending upon the kind of the optical function part 50 to be formed.

As a method for optically connecting the through optical device 39 to the optical function part 50, various kinds of procedures such as a method for connecting them by bending a foil-shaped light guide body, a method for connecting them using molten glass or optical resin, a method for connecting them by polymerizing low-molecular liquid resin, and the like can be used depending upon the purpose and configuration. Furthermore, methods other than the above also can be used. The optical connection between the internal connection optical device 59 and the optical function part 50 also can be performed in the same way as the above.

In order to perform charging/discharging with respect to the battery cell 20, it is preferable that an external electrode electrically connected respectively to the negative collector 23 and the positive collector 27 is formed. In this case, it is necessary that the positive electrode and the negative electrode of the battery cell 20 are not connected to each other directly. For this purpose, it is necessary to adjust the film-forming position during film formation, and the pattern mask 4 is an example thereof. A slit-shaped opening is provided in the pattern mask 4, and a thin film is formed through the pattern mask 4, whereby the position where the thin film is formed is limited by the position of the opening. By changing the position and width of the opening of the pattern mask 4 during formation of each layer constituting the battery cell 20, film formation can be performed in a desired pattern on a layer basis. Furthermore, by providing slit-shaped multi-openings with the longitudinal direction thereof being the traveling direction of the substrate 10, a plurality of the battery cells 20 also can be formed in the width direction of the substrate 10.

When sheet-shaped materials (lamination units), in each of which the wiring pattern 47, the substrate 10, and the battery cell 20 are laminated in this order, are laminated, it is necessary to prevent a short-circuit between the wiring pattern 47 and the constituent elements (e.g., a collector) of the battery cell 20 of adjacent sheet-shaped materials. For this purpose, it is effective to interpose an insulating member between the wiring pattern 47 and the battery cell 20 as the insulating layer first insulating layer) 46. It is preferable that, before being interposed, the insulating layer 46 is provided with holes at positions where the opening 37, the through electrode 38, the internal connection electrode 48, the through optical device 39, the internal connection optical device 59, and the like are to be provided. As the insulating member, for example, a polymer substrate made of polyethylene terephthalate (PET), polyethylene naphthalate (PEN), polyamide (PA), polyimide (PI), or the like; or a coating film of epoxy resin, phenol resin, or the like can be used.

As the production method of each layer constituting the battery cell 20, a method using a vacuum thin film process has been described. However, the present invention is not limited thereto, and each layer also can be produced by a wet process such as paste coating performed widely for lithium ion secondary batteries.

For forming the opening 37, the through electrode 38, the internal connection electrode 48, the through optical device 39, and the internal connection optical device 59, it is important to treat the circumferential surface of the holes. That is, if the treatment of the inner wall surfaces of the holes is not appropriate, there is a danger that the positive and negative collector layers 23, 27, and the electrode active material layers 24, 26 are short-circuited, whereby accumulated energy in the energy device is lost, and the energy device generates heat abnormally. In order to prevent this, it is necessary to form the holes carefully.

One method for forming the holes is as follows. After the battery cell 20 is formed over an entire surface including positions where the holes are to be formed, through-holes are formed by a drill, a laser, etching, or other methods. Then, portions of the collector layers 23, 27 and the electrode active material layers 24, 26 exposed at the inner wall surfaces of the holes are insulated, for example, by a plasma treatment, a chemical solution treatment, etc. This can prevent the collector layers 23, 27 and the electrode active material layers 24, 26 from being short-circuited to cause the loss of accumulated energy in the energy device and the abnormal heat generation by the energy device.

According to another method for forming holes, the collector layers 23, 27 and the electrode active material layers 24, 26 are formed while regions relatively larger than the positions where the holes are to be formed are masked, so that the collector layers 23, 27 and the electrode active material layers 24, 26 recede from the inner wall surfaces of the holes. In a thin film process, masking can be adapted by applying a resist method performed widely in a semiconductor process and the like, and an oil masking method having a long history in a film capacitor, as well as a method using a masking tape. Furthermore, in a coating process, a method using a masking tape, screen printing, or the like can be used. The collector layers 23, 27 and the electrode active material layers 24, 26 are formed while regions larger than those where the holes are to be formed are masked, and the electrolyte layer 25 is formed while regions substantially matched with the holes are masked. Consequently, through-holes can be formed. Alternatively, the following may be performed: the collector layers 23, 27 and the electrode active material layers 24, 26 are formed while regions larger than those where the holes are to be formed are masked, and the electrolyte layer 25 is formed over an entire surface without masking; thereafter, through-holes smaller than the masking regions of the collector layers 23, 27 and the electrode active material layers 24, 26 are formed by a drill, a laser, etching, or other methods. Because of this, the collector layers 23, 27 and the electrode active material layers 24, 26 are not exposed at the inner wall surfaces of the holes. Thus, the collector layers 23, 27 and the electrode active material layers 24, 26 can be prevented from being short-circuited to cause the loss of the accumulated energy in the energy device, and the abnormal generation of heat by the energy device.

The through-hole formed considering the safety as described above can be used directly as the opening 37. Furthermore, the through electrode 38, the internal connection electrode 48, the through optical device 39, or the internal connection optical device 59 may be placed in such through-holes. In this case, if required, an insulating agent 41 of an organic material or an inorganic material may be provided between the through electrode 38, the internal connection electrode 48, the through optical device 39, and the internal connection optical device 59, and the inner wall surfaces of the through-holes, and on circumferences of the through-holes. Furthermore, a protective agent, a desiccant, and a reinforcing agent may be provided in place of the insulating agent 41 or together therewith.

The energy device of the present invention can be configured in such a manner that the sheet-shaped battery cells 20 are connected in series or in parallel to each other. Each piece of the sheet-shaped battery cell 20 may be laminated. Alternatively, the band-shaped battery cell 20 may be wound in a flat shape or fanfolded. Furthermore, the energy device of the present invention may be configured in such a manner that the respective layers constituting the battery cell 20 are formed on the substrate 10 in plural layers, whereby a plurality of the battery cells 20 are laminated continuously on the single substrate 10 in the thickness direction. In these various configurations, the method for connecting the battery cells 20 in series or in parallel can be easily realized, for example, by selecting the electrical connection order and connection method between the collectors of the respective battery cells 20. For connection between the collectors, various kinds of methods such as direct lamination, welding, soldering, caulking, wire bonding, via connection, etc. are selected to be used depending upon the product form and purpose.

The energy device may be subjected to a warming press treatment if required.

Thereafter, if required, external electrodes (not shown) connected respectively to the negative collector 23 and the positive collector 27 may be formed. The energy device may be charged/discharged via the external electrodes. As the material for the external electrode, various kinds of conductive materials such as nickel, zinc, tin, a solder alloy, conductive resin, etc. can be used. As the method for forming the external electrode, welding, thermal spraying, plating, coating, or the like can be used.

Furthermore, the energy device also can be covered with a protective material (not shown). By using various kinds of laminate wrapping materials proposed in a polymer battery, or performing coating or dipping with protective resin, the reliability of the energy device is enhanced.

The energy device of the present invention is applicable to various kinds of equipment. However, to change the arrangement of the through electrodes 38 depending upon each equipment is not economical in terms of the switching cost of design and production, the delivery date to a customer, and the manufacturer's inventories. To arrange the through electrodes 38 in a lattice point pattern and produce such an arrangement as a predetermined standard product for the purpose of overcoming the above-mentioned problem has a great significance in terms of the ability to prevent the shift of responsibility of a design cost to a user and the ability to shorten a delivery date.

As described above, the wiring pattern 47 and/or the optical function part 50 are buried in the energy device of the present invention, so that various kinds of electronic components and optical components arranged on the circumference of the energy device in electronic equipment can be connected efficiently without installing lengthy wiring. To shorten the length of wiring is effective for the reduction in the cost of members to be used, the reduction in volume and weight, and the reduction in factors of equipment trouble. Furthermore, in the case where the energy device is used for high-frequency equipment, to shorten the length of electric wiring is effective for preventing the adverse effect of a floating inductance, and can prevent a malfunction. Furthermore, the constraint on the arrangement of electronic components and optical components, which is conventionally necessary so as to avoid lengthy wiring, can be reduced greatly, whereby the degree of freedom in the arrangement of various kinds of components can be enhanced.

EXAMPLE 1

An example of the energy device corresponding to Embodiment 1 will be described.

A wiring pattern 47 was formed on one surface of a PEN substrate 10 (thickness: 50 μm), and a positive collector layer 27, a positive active material layer 26, a solid electrolyte layer 25, a negative active material layer 24, a negative collector layer 23, and a protective layer (not shown) were formed in this order on the other surface of the PEN substrate 10.

As the wiring pattern 47, copper was patterned on the PEN substrate 10 by vapor deposition. The thickness of vapor deposition was set to be 0.3 μm. On the surface of the PEN substrate 10 opposite to the surface on which the wiring pattern 47 was formed, aluminum was formed to a thickness of 0.5 μm by vapor deposition as the positive collector layer 27, lithium cobaltate was formed to a thickness of 5 μm by sputtering as the positive active material layer 26, a lithium phosphate material was formed to a thickness of 2 μm by sputtering as the solid electrode layer 25, metallic lithium was formed to a thickness of 2 μm by vapor deposition as the negative active material layer 24, and nickel was formed to a thickness of 2 μm as the negative collector layer 23. On the negative collector layer 23, acrylic resin was formed to a thickness of 20 μm by vapor deposition as the protective layer and cured.

Figure 3:
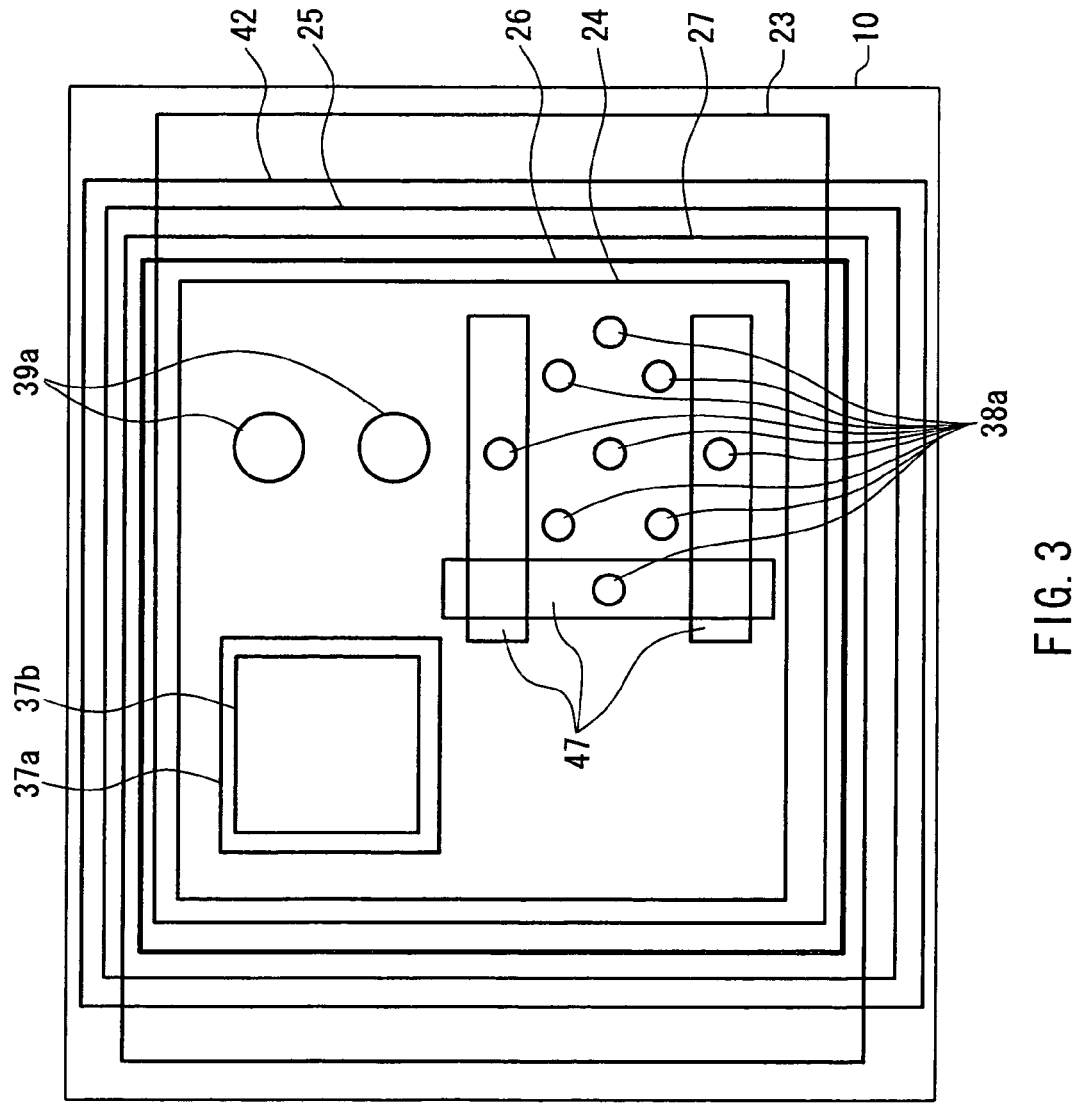
FIG. 3 is a projection diagram showing a formed pattern of each thin-film layer in Example 1 of the present invention.

At this time, the formation region of each layer was limited by masking as shown in FIG. 3. FIG. 3 is a perspective view showing the formation region of each layer on the substrate 10. The external dimension of the substrate 10 was set to be about 100 mm×80 mm. Each wiring pattern 47 was set to have a width of 3 mm and a length of 60 mm. At a position of a region 37b of the substrate 10, a through-hole (30 mm×30 mm) was formed previously. As shown in FIG. 3, the positive collector layer 27 was exposed at a left side end of the energy device, and the negative collector layer 23 was exposed at a right side end.

Reference numeral 37a denotes a masking region for forming the positive collector layer 27, the positive active material layer 26, the negative active material layer 24, and the negative collector layer 23, and reference numeral 37b denotes a masking region for forming the solid electrolyte layer 25 and the protective layer. Masking of the regions 37a and 37b were performed using a metal mask. A metal mask (36 mm×36 mm) was used for the masking region 37a, and a metal mask (30 mm×30 mm) was used for the masking region 37b. Thus, one through-hole (about 30 mm×30 mm) for the opening 37 was formed. On an inner wall surface of the through-hole, the positive collector layer 27, the positive active material layer 26, the negative active material layer 24, and the negative collector layer 23 were not exposed, and the inner wall surface was covered with the solid electrolyte layer 25 or the protective layer.

When a metal mask was used, in order to prevent a non-film formation region from being formed by an arm supporting the metal mask, the arm was set to be as thin as possible, and the arm and the film-formation surface were placed as far apart as possible. More specifically, the arm was connected to the metal mask so as to be vertical to the metal mask surface, and the arm was bent so as to be substantially parallel to the metal mask surface at a distance of about 100 mm from the metal mask.

Reference numerals 38a and 39a denote masking regions for forming the positive collector layer 27, the positive active material layer 26, the negative active material layer 24, and the negative collector layer 23. Masking of these regions was performed using a masking tape having a diameter larger by 2 mm than that of a through-hole to be obtained finally. Masking was not performed when the solid electrolyte layer 25 and the protective layer were formed. Consequently, only the solid electrolyte layer 25 and the protective layer were formed in the regions 38a, 39a. After the protective layer was formed, through-holes each having a diameter smaller by 2 mm than that of the masking tapes respectively used for the regions 38a, 39a were formed therein by precision drill processing. On an inner wall surface of each through-hole thus formed, the positive collector layer 27, the positive active material layer 26, the negative active material layer 24, and the negative collector layer 23 were not exposed. Because of this, through-holes (diameter: about 1.5 mm) for a through electrode 38 were formed respectively in nine regions 38a arranged in a lattice point or matrix shape. Furthermore, through-holes (diameter: about 4 mm) for a through optical device 39 were formed respectively in two regions 39a.

The wiring pattern 47 was placed at only one position for one substrate 10, and the formation position thereof was varied in three ways on the substrate 10 basis. The wiring patterns 47 were arranged so that three kinds of wiring patterns 47 whose positions were varied in three ways were overlapped in a substantially "U" shape, when the energy device obtained finally was viewed in the lamination direction. Then, three regions among nine regions 38a were arranged at positions overlapped respectively with three kinds of wiring patterns 47.

Then, three sheet-shaped materials each including the layers thus formed (i.e., the substrate 10 to the protective layer) were overlapped with the surfaces of the wiring patterns 47 placed downward so that the positions of the respective through-holes for the opening 37, the through electrode 38, and the through optical device 39 were aligned. In this case, in order to prevent a short-circuit between the wiring pattern 47 and the constituent elements of the battery cell 20, a PET substrate (thickness: 10 μm) was interposed between adjacent sheet-shaped materials as an insulating layer (first insulating layer) 46. In the insulating layer 46, one through-hole (about 30 mm×30 mm) for the opening 37, nine through-holes (diameter: about 1.4 mm) for the through electrode 38, and two through-holes (diameter: about 4 mm) for the through optical device 39 were formed previously. Furthermore, gold was vapor-deposited to a diameter of 4 mm and a thickness of 0.5 μm as an auxiliary pattern 49 on the circumference of each through-hole (diameter: about 1.4 mm).

After lamination, wiring was installed between the positive collector layers 27 and between the negative collector layers 23 of the respective sheet-shaped materials, followed by solder connection, whereby an external electrode was formed. Thereafter, gold thin bars (diameter: 1.5 mm) were inserted respectively in nine through-holes formed in the regions 38a, and both ends of each thin bar were deformed carefully to be crushed to form a rivet shape, whereby the through electrodes 38 were formed. Since the inner diameter of each through-hole for the through electrode 38 formed in the insulating layer 46 was about 1.4 mm, the gold thin bar was connected electrically to the wiring pattern 47 exactly via the auxiliary pattern 49. Then, in one of two through-holes (diameter: about 4 mm), 25 bound optical fibers each having a diameter of 0.3 mm and a length of 100 mm were inserted as the through optical device 39, and an adhesive was provided in the gap between the optical fibers and the through-hole to fix the optical fibers to a circumferential edge of the through-hole. In the other through-hole, a barrel with a glass lens (diameter: 4 mm) was fit in as the through optical device 39, and an adhesive was provided thinly at the circumference of the barrel to fix the barrel to a circumferential edge of the through-hole. The through-hole (about 30 mm×30 mm) can be used as the opening 37. In the opening 37, for example, a deflection filter was able to be fit in.

EMBODIMENT 2

Figure 4:
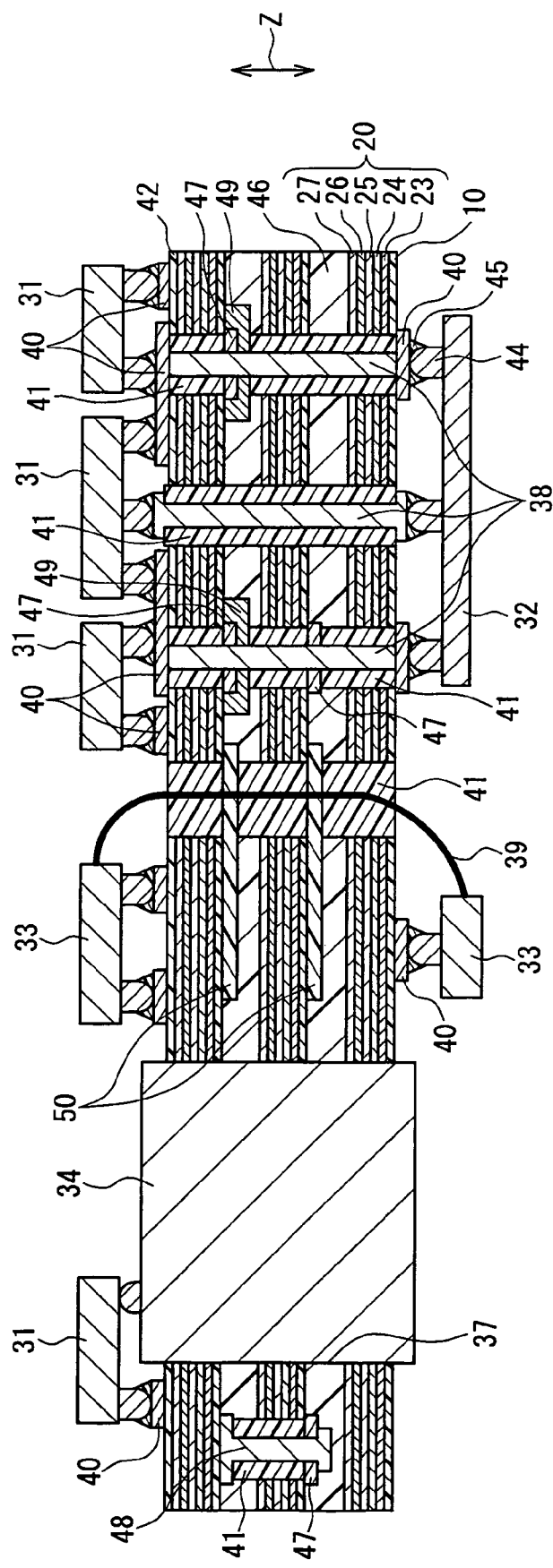
FIG. 4 is a cross-sectional view schematically showing one embodiment of a configuration of electronic equipment of the present invention.

Electronic equipment of the present invention will be described. FIG. 4 is a cross-sectional view schematically showing an example of a configuration of the electronic equipment of the present invention. The electronic equipment of the present invention is configured using the energy device described in Embodiment 1 as a storage energy portion. In FIG. 4, the same components as those described in Embodiment 1 are denoted with the same reference numerals as those therein, and the detailed description thereof will be omitted here.

In FIG. 4, reference numeral 40 denotes an external wiring pattern. By forming the external wiring pattern 40 on one outer surface or both outer surfaces of the energy device, the electronic equipment further can be reduced in thickness and have enhanced function. That is, the front surface or the back surface of the energy device has a large area satisfactory for forming the external wiring pattern 40, and electronic components and the like can be mounted on one surface or both surfaces of the energy device with high density, also using the external wiring pattern 40, as well as the through electrode 38 and the internal wiring pattern 47 of the energy device. Thus, the use of another wiring substrate can be decreased or omitted, whereby the miniaturization, and the reduction in thickness and weight of electronic equipment can be realized.

The external wiring pattern 40 can be formed of the known material by the known method similar to those of a wiring layer to be formed on the surface of a conventional wiring substrate. In the case of forming the external wiring pattern 40, in order to prevent a short-circuit between wirings, it is preferable that an insulating layer (second insulating layer) 42 is provided on the surface of the energy device, and the external wiring pattern 40 is formed on the surface of the insulating layer 42. In the case where the substrate 10 is made of an insulating material, the external wiring pattern 40 can be formed directly on the substrate 10.

By forming the external wiring pattern 40 on the insulating layer 42 to bring the insulating layer 42 and the energy device into surface joining or surface contact, or by forming the external wiring pattern 40 on the insulating substrate 10, heat is transmitted/received between the energy device and the electronic components mounted on the external wiring pattern 40. In general, a battery using a solid electrolyte has a problem in that a battery capacity decreases at low temperature. In the case where the energy device is a secondary battery using a solid electrolyte, heat generated by the mounted electronic components is transmitted to the energy device. Therefore, even when the electronic equipment is used in a cold environment, the energy device using a solid electrolyte can perform a relatively satisfactory battery operation.

In FIG. 4, reference numeral 31 denotes various kinds of electronic components electrically connected to the external wiring pattern 40 and the through electrode 38, such as a semiconductor chip, a chip resistor, a chip capacitor, and the like. Reference numeral 32 denotes a sheet device electrically connected to the external wiring pattern 40 or the through electrode 38, such as a wiring substrate on which various kinds of electronic components are mounted. Reference numeral 33 denotes an optical component connected to the through optical device 39, such as a semiconductor laser, a light-receiving element, an optical filter, and the like. The optical component 33 may be electrically connected to the external wiring pattern 40 or the through electrode 38. The electronic component 31, the sheet device 32, and the optical component 33 may be mounted on the surface of the energy device, or placed on another substrate. As a mounting method in the case of mounting on the energy device, not only a mounting method via a connection terminal 44 such as a bump and a conductive adhesive 45 as shown in FIG. 4, but other known methods can be used.

In the electronic equipment of the present invention, the electronic components 31 and the sheet device 32 placed on both sides of the energy device can be connected to each other via the through electrode 38. Furthermore, the optical components 33 placed on both sides of the energy device can be connected to each other via the through optical device 39. This enhances the degree of freedom in arrangement of the electronic components 31, the sheet device 32, the optical components 33, and the energy device, and enables them to be placed with high efficiency. Therefore, the electronic equipment can be miniaturized, reduced in weight and thickness, and made flexible. Furthermore, wiring for connecting the electronic components 31, the sheet device 32, and the optical components 33 placed on both sides of the energy device can be omitted or shortened.

Furthermore, if the external wiring pattern 40 is formed on one surface or both surfaces of the energy device, the electronic components 31, the sheet device 33, the optical components 33, and the like can be connected to the through electrode 38 and/or the external wiring pattern 40. Because of this, the energy device can be handled as a substrate material, and the electronic components 31, the sheet device 32, the optical components 33, and the like can be mounted in the vicinity of the energy device with high density. Thus, the electronic equipment further can be miniaturized, reduced in weight and thickness, and made flexible.

Furthermore, it is preferable that the electronic equipment of the present invention includes a protective element for detecting the abnormal operation of the battery cell 20 to disconnect a circuit. In this case, when the protective element is placed as close to the battery cell 20 as possible, abnormality can be detected immediately, and the damage to the entire equipment can be minimized. Needless to say, it is advantageous that, in particular, a temperature-sensing protective element is placed in the vicinity of the battery cell 20. For example, when the protective element is mounted on the surface of the energy device, it becomes easy to detect an abnormal increase in temperature. Thus, it is preferable that the protective element is included in the electronic components 31 electrically connected to the external wiring pattern 40 or the through electrode 38 to be mounted on the surface of the energy device.

Reference numeral 34 denotes various kinds of components placed in the opening 37, and there is no particular limit to the kinds thereof. Examples of the various kinds of components include electronic components such as a liquid crystal display device, an EL display device, and the like. In addition, mechanical components such as a switch, a printing head, a motor, etc., semiconductor chips such as a CPU, a memory, etc., and optical components such as a lens, a backlight, a CCD, a filter, a deflector, an analyzer, a mirror, etc. also can be placed in the opening 37. Furthermore, it also is possible to route a conductive cable, an optical fiber, and the like through the opening 37. It is preferable that the position and size of the opening 37 are set appropriately in accordance with the kinds of components to be placed therein. For example, by placing a component, which preferably is placed at a relatively central position in electronic equipment, and a relatively thick component in the opening 37, the reduction in thickness of the electronic equipment and the enhancement of operability and design values can be realized. Furthermore, a constraint on the arrangement for the purpose of avoiding the interference between the energy device and various kinds of components is eliminated, whereby the degree of freedom in arrangement between the energy device and various kinds of components in electronic equipment is enhanced remarkably.

For example, as the through optical device 39, the bound optical fibers can be inserted in a though-hole provided in the energy device, and fixed thereto with an adhesive. As another example of the through optical device 39, a barrel with a CCD can be fit in a through-hole provided in the energy device, and the circumference thereof can be cemented thinly with an adhesive. A small display element can be fit in the opening 37. The electronic components 31 such as a semiconductor chip, a chip capacitor, a chip resistor, a chip coil, etc., and various kinds of sheet devices 32, etc. can be surface-mounted on both surfaces of the energy device by solder reflow using the external wiring pattern 40 and the through electrode 38. It also is possible to mount a PTC protective element and the like. The electronic equipment with these components mounted thereon can be accommodated in a housing made of soft resin.

It also is possible to cover an energy device portion of the electronic equipment with a protective material. As the protective material, various kinds of laminate wrapping materials reported in a polymer battery, and a protective resin layer can be used. This enhances the reliability of the electronic equipment.

EXAMPLE 2

An example of the electronic equipment corresponding to Embodiment 2 will be described.

A wiring pattern 47 (thickness: 0.3 µm) was formed on one surface of a polyimide substrate 10 (thickness: 25 µm), and a positive collector layer (thickness: 1 µm) 27, a positive active material layer (thickness: 4 µm) 26, a solid electrolyte layer (thickness: 2 µm) 25, a negative active material layer (thickness: 2 µm) 24, a negative collector layer (thickness: 1 µm) 23, and a protective layer (thickness: 50 µm) were formed in this order on the other surface of the polyimide substrate 10, respectively, using the same materials and the same method as those in Example 1.

The external dimension of the substrate 10 was set to be about 100 mm×60 mm, and a through-hole (about 30 mm×30 mm) was formed previously in a region where the opening 37 was to be formed. Masking was performed in the same way as in Example 1, whereby the positive collector layer 27 was exposed at a left side end of the energy device, and the negative collector layer 23 was exposed at a right side end. One through-hole (about 30 mm×30 mm) for the opening 37 was formed, eight through-holes (diameter: about 1.5 mm) for the through electrode 38 and the internal connection electrode 48 were formed in a lattice point or matrix shape, and two through-holes (diameter: about 6 mm) for the through optical device 39 were formed in the same way as in Example 1. The wiring pattern 47 was set to have a width of 3 mm and a length of 50 mm, and was formed at only one position for one substrate 10. In the same way as in Example 1, the formation position of the wiring pattern 47 was varied in three ways on the substrate 10 basis so that three kinds of wiring patterns 47 were overlapped in a substantially "U" shape, when the energy device obtained finally was viewed in the lamination direction. Three of eight regions 38a were arranged at positions overlapped respectively with three kinds of wiring patterns 47. Then, 30 first sheet-shaped materials each including the layers thus formed (i.e., the substrate 10 to the protective layer), which were identical to each other except for the wiring pattern 47, were formed.

Furthermore, two polyimide substrates (thickness: 50 µm and external dimension: about 100 mm×60 mm) with a desired external wiring pattern 40 formed on one surface were formed. The external wiring pattern 40 was different from any of the above-mentioned three kinds of wiring patterns 47. In this polyimide substrate, in the same way as in the substrate 10 of the first sheet-shaped material, one through-hole (about 30 mm×30 mm) was formed in a region where the opening 37 was to be formed, four through-holes (diameter: about 1.5 mm) were formed at positions where the through electrodes 38 were to be formed, and two through-holes (diameter: about 6 mm) were formed at positions where the through optical devices 39 were to be attached. The battery cell 20 and the protective layer were not formed on the polyimide substrate, unlike the substrate 10 of the first sheet-shaped material.

On a surface plate, 30 first sheet-shaped materials were laminated successively with the surface of each wiring pattern 47 side placed downside so that the respective through-holes for the opening 37, the through electrode 38, the internal connection electrode 48, and the through optical device 39 were aligned. In this case, in order to prevent a short-circuit between the wiring pattern 47 and the constituent elements of the battery cell 20, a PET substrate (thickness: 25 µm) was interposed as the insulating layer (first insulating layer) 46 between adjacent first sheet-shaped materials. In the insulating layer 46, one through-hole (about 30 mm×30 mm) for the opening 37, eight through-holes (diameter: about 1.4 mm) for the through electrode 38 and the internal connection electrode 48, and two through-holes (diameter: about 6 mm) for the through optical device 39 were formed previously. Furthermore, gold was vapor-deposited to a diameter of 4 mm and a thickness of 0.5 µm as an auxiliary pattern 49 on the circumference of each through-hole (diameter: about 1.4 mm).

After lamination, gold thin bars (diameter: 1.5 mm) were inserted respectively in four of eight through-holes for the through electrode 38 and the internal connection electrode 48, and both ends of each thin bar were deformed carefully to be crushed to form a rivet shape, whereby four internal connection electrodes 48 were formed.

Next, on both sides of 30 first sheet-shaped materials, two polyimide substrates each having an external wiring pattern 40 formed on one surface were laminated with the surface on the external wiring pattern 40 side placed outside so that the respective through-holes for the opening 37, the through electrode 38, and the through optical device 39 were aligned. At this time, among eight through-holes (diameter: about 1.5 mm) of the first sheet-shaped materials, the positions of four through-holes through which a gold thin bar had not been inserted, and the positions of four through-holes for the through electrode 38 formed in the polyimide substrates were matched with each other. Gold thin bars (diameter: 1.5 mm) were inserted respectively in these four through-holes, and both ends of each thin bar were deformed carefully to be crushed to form a rivet shape, whereby four through electrodes 38 were formed. Thus, four through electrodes 38 exposed at the surfaces of the front and back polyimide substrates, and four internal connection electrodes 48 covered with the front and back polyimide substrates were formed.

Then, in one of two through-holes (diameter: about 6 mm), 15 bound optical fibers each having a diameter of 0.2 mm and a length of 100 mm were inserted as the through optical device 39, and an adhesive was provided in a gap between the optical fibers and the through-hole to fix the optical fibers to a circumferential edge of the through-hole. In the other through-hole, a barrel with a CCD (diameter: 6 mm) was fit in as the through optical device 39, and an adhesive was provided thinly at the circumference of the barrel to fix the barrel to a circumferential edge of the through-hole.

The through-hole (about 30 mm×30 mm) was used as the opening 37, and a small display element was fit in the opening 37. Required electronic components and optical components were placed on both surfaces of the energy device so that a video taken by the CCD was displayed on the display element. The resultant energy device was accommodated in a housing made of soft resin. Various kinds of components were surface-mounted using the external wiring pattern 40 as much as possible, and a circuit was configured using the through electrode 38, the internal connection electrode 48, and the wiring pattern 47. Light from a light source mounted on the energy device in the housing was guided to an operation display lamp provided on the surface of the housing, using an optical fiber placed as the through optical device 39, whereby the lamp was lit.

It was confirmed that the electronic equipment thus obtained can display a photographed moving image on the display element, even though the operation time is several minutes. It also was confirmed that the electronic equipment can be operated even when being bent slightly, in spite of the thinness thereof.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An energy device comprising at least a plurality of sheet-shaped battery cells, in which a positive collector, a negative collector, an electrode active material, and an electrolyte are laminated, and a plurality of substrates, the sheet-shaped battery cell and the substrate being laminated alternately a plurality of times, the energy device further comprising:
an internal wiring pattern that is formed on at least one substrate excluding a substrate constituting an outermost layer of the energy device among the plurality of substrates, and that is not connected directly to any of the positive collector, the negative collector, and the electrode active material;
a through electrode that electrically connects the internal wiring pattern to a surface of the energy device, and that is not connected directly to any of the positive collector, the negative collector, and the electrode active material; and
a through optical device extending through the energy device.

2. The energy device according to claim 1, wherein the through electrodes are arranged in a lattice point shape.

3. The energy device according to claim 1, further comprising an internal connection electrode that is electrically connected to a plurality of the internal wiring patterns formed at different positions in a thickness direction, is not connected directly to any of the positive collector, the negative collector, and the electrode active material, and is not electrically connected to the surface of the energy device.

4. The energy device according to claim 1, further comprising an opening extending through the energy device in the thickness direction.

5. Electronic equipment comprising the energy device of claim 4, and
at least one selected from the group consisting of an electronic component, a mechanical component, a semiconductor chip, an optical component, a conductive cable, and an optical fiber placed in the opening.

6. The energy device according to claim 1, wherein the electrolyte is a solid electrolyte.

7. The energy device according to claim 1, wherein the battery cell is a lithium ion battery.

8. The energy device according to claim 1, comprising at least two of the battery cells in the thickness direction.

9. The energy device according to claim 1, comprising at least two lamination units, each including a wiring pattern, the substrate, and the battery cell, via a first insulating layer in the thickness direction.

10. Electronic equipment comprising the energy device of claim 1, and
electronic components placed on both sides of the energy device, electrically connected to each other via the through electrode.

11. The electronic equipment according to claim 10, further comprising an internal connection electrode tat is electrically connected to a plurality of the internal wiring patterns formed at different positions in the thickness direction, is not connected directly to any of the positive collector, the negative collector, and the electrode active material, and is not electrically connected to a surface of the energy device.

12. The electronic equipment according to claim 10, wherein the electronic components include a protective element for the battery veils.

13. Electronic equipment comprising:
the energy device of claim 1;
an external wiring pattern formed on one surface or both surfaces of the energy device; and
an electronic component placed on one side or both sides of the energy device,
wherein the electronic component is electrically connected to the trough electrode and/or the external wiring pattern.

14. Electronic equipment according to claim 13, further comprising an internal connection electrode that is electrically connected to a plurality of the internal wiring patterns formed at different positions in the thickness direction, is not connected directly to any of the positive collector, the negative collector, and the electrode active material, and is not electrically connected to the surface of the energy device.

15. The electronic equipment according to claim 13, wherein the electronic component includes a protective element of the battery cells.

16. The electronic equipment according to claim 13, wherein the external writing pattern is formed on a second insulating layer, and the second insulating layer and the energy device are in surface joining or surface contact with each other.

* * * * *

UNITED STATES PATENT AND TRADEMARK OFFICE
CERTIFICATE OF CORRECTION

| | | |
|---|---|---|
| PATENT NO. | : 7,579,109 B2 | Page 1 of 1 |
| APPLICATION NO. | : 11/028826 | |
| DATED | : August 25, 2009 | |
| INVENTOR(S) | : Honda et al. | |

It is certified that error appears in the above-identified patent and that said Letters Patent is hereby corrected as shown below:

Column 20, line 31 (claim 11): "tat" should read as --that--.
Column 20, line 47 (claim 13): "trough" should read as --through--.
Column 20, line 60 (claim 16): "writing" should read as --wiring--.

Signed and Sealed this

Sixteenth Day of February, 2010

David J. Kappos
*Director of the United States Patent and Trademark Office*